Patented Aug. 17, 1954

2,686,811

UNITED STATES PATENT OFFICE 2,686,811

ONE-STEP PROCESS FOR PREPARING DIISOPROPYLAMINE

Willard C. Bull, Joplin, Mo., assignor to Commercial Solvents Corporation, Terre Haute, Ind., a corporation of Maryland No Drawing. Application October 12, 1949, Serial No. 121,072

6 Claims. (Cl. 260—585)

My invention relates to a process for preparing diisopropylamine by catalytically reacting ammonia, acetone and hydrogen. More particularly, my invention relates to a one step process for preparing diisopropylamine by reacting ammonia with acetone and hydrogen in the presence of water and a modified copper oxide catalyst.

In the past the customary method of producing secondary amines, and in particular dialkylamines such as diisopropylamine, has been to employ a process such as that of Loffler (Berichte, volume 43, pages 2031–5), Skita and Keil (Berichte, vol. 61 B, pages 52–9), or Adkins et al. (U. S. Patent No. 2,045,574). Loffler prepared his secondary amines by mixing acetone with a cold saturated absolute alcoholic solution of ammonia and after 1 week gradually adding sodium to the resulting product. From the use of 80 grams of acetone, however, he obtained only 12 grams of a mixture of isopropylamine and diisopropylamine. Skita and Keil prepared diisopropylamine by mixing 16 grams of acetone with 20 ml. of 24% aqueous ammonia and hydrogenating the resulting product at room temperature and 3 atmospheres pressure in the presence of a colloidal platinum catalyst. A yield of only 19% of diisopropylamine was thereby obtained. Adkins et al. produced secondary and tertiary amines by hydrogenating a mixture of a primary amine and a carbonyl compound in the presence of a nickel catalyst and claimed to have obtained a 70% yield of bicyclohexylamine by thus reacting cyclohexanone and cyclohexylamine (based on the cyclohexylamine used).

It will be obvious that the Loffler process is impractical for large scale commercial utilization both because of the time required for the reaction and the low yields of the desired product. The process of Skita and Keil is similarly unsuitable because of the low yields of secondary amines produced. The Adkins' et al. process has the added disadvantage of starting with a primary amine thus requiring two operations instead of one as in applicant's process to be described below. When this fact is taken into consideration their yield of 70% of secondary amine becomes very much lower when recalculated on the basis of the ammonia and ketone used as the initial starting materials.

Applicant's new process and the yields obtained by it show even more striking advantages over the other processes previously available for the production of diisopropylamine since the prior art processes in general require the use of expensive starting materials or a two step process wherein the ammonia, ketone and hydrogen are first reacted in the presence of a nickel catalyst to produce a primary amine which is subsequently reacted in a separate operation with additional ketone and the reaction product thus produced catalytically hydrogenated to form the desired secondary amine. By my new process, diisopropylamine is simply produced in a single operation by the reaction of ammonia, acetone and hydrogen in the presence of water, thus eliminating a complete step and resulting in a tremendous saving of time, equipment and materials.

My process consists essentially of charging ammonia, acetone, water and a catalyst into a suitable reaction vessel and hydrogenating the mixture at elevated temperatures and pressures until hydrogen ceases to be absorbed. The reaction mixture is then cooled, the contents discharged and the products isolated in a known manner.

In carrying out my improved process for the production of diisopropylamine, I can use pure acetone or commercial grades of acetone which are nearly pure. Acetone in aqueous solution can be used, provided it does not contain water in excess of the amounts shown below, to give optimum yields of diisopropylamine.

The ammonia is preferably used in the form of anhydrous liquid ammonia although aqueous ammonia can be used, provided it does not contain water in excess of the amounts shown below, to give optimum yields of diisopropylamine.

The ratio of the reactants, namely acetone and ammonia, can be varied over a fairly wide range. Changes in the ratio of reactants, however, affect to a considerable degree the character of the products obtained as a result of the reaction. For example, for optimum yields of diisopropylamine I prefer to use 2 moles of acetone to 1 mole of ammonia. Changing the ratio to 1 mole of acetone to 1 mole of ammonia results in greatly increased amounts of unreacted ammonia of the order of 90% of the ammonia charged. If, on the other hand, the ratio is raised to 8 moles of acetone to 1 of ammonia a large amount of the acetone used is wasted.

The amount of water which I use in my process in order to obtain optimum yields of diisopropylamine ranges from 3 to 10%, based on the total volume of the reactants. When amounts below this range are employed the yields of diisopropylamine are reduced and increased amounts of ammonia remain unreacted. When amounts of water in excess of the above range are employed, the yields of diisopropylamine are decreased and the presence of the increased amount of water results in an increased amount of unreacted ammonia in the reaction product and reduced amounts of monoisopropylamine.

The catalyst used in my process is a modified copper oxide catalyst such as copper chromite or co-precipitated cupric oxide-calcium fluoride. The copper chromite catalyst can be produced by the method of Calingaert and Edgar described in Ind. Eng. Chem. 26, 878-880 (1934). This method consists generally, of reacting a copper salt, such as the sulfate, with the dichromate of an alkali metal such as sodium, and ammonia, to form a precipitate of copper ammonium chromate, which is then washed, dried, and roasted to produce copper chromite suitable for use in my process. Co-precipitated copper oxide-calcium fluoride can be produced by the method of Stengel and Maple described in U. S. Patent 2,381,316 which comprises reacting copper sulfate, sodium fluoride, calcium chloride, and sodium hydroxide to form a precipitate consisting of cupric hydroxide and calcium fluoride which is then separated, washed and dried to produce the co-precipitate cupric oxide-calcium fluoride catalyst. Other methods may be used for producing the catalysts, the above procedures being cited merely as convenient and desirable methods, and other modified copper oxides can be used as catalysts in my process.

The temperatures employed in my process are preferably of the order of 150° C. to 180° C., but may extend over a range of about 140° to about 200° C., the optimum reaction temperature being apparently about 160° C. In general, when reaction temperatures near the limits of the range specified are used, the yields of diisopropylamine are comparatively low, and consequently the product contains unreacted ammonia.

In carrying out my process superatmospheric pressures of from 500 to 1500 pounds per sq. in. are used. The lower pressures require a longer reaction time and are characterized by lower yields. As the pressure increases the reaction time is decreased and while there is apparently no upper limit to the pressure which can be used, I prefer to carry out my process at pressures somewhat less than 1500 lbs. per sq. in., and more specifically at approximately 1000 lbs. per sq. in.

The reaction is gauged by the pressure drop in the reaction chamber. During the reaction, hydrogen is added whenever the pressure in the reaction vessel drops below the selected operating pressure. The reaction is complete when no further pressure drop occurs thus indicating that hydrogen is no longer being absorbed.

In carrying out my process a mixture of the reactants and catalyst is introduced into a pressure vessel equipped with a suitable stirrer and a jacket or coil for maintaining the charge at the desired temperature. Preferably, the vessel is cooled prior to introduction of the reaction mixture in order to minimize the loss of ammonia. The reaction vessel is then sealed and heated to the desired reaction temperature. During the reaction, hydrogen is added either intermittently or continuously as required in order to maintain the pressure at the desired level. When the reaction is complete as evidenced by cessation of pressure drop, the reaction mixture is cooled, the reaction vessel vented, the contents discharged, and the product isolated in any convenient manner such as by fractional distillation.

Alternately, my process is carried out by passing a slurry of the powdered catalyst and the liquid reaction mixture through a column in contact with hydrogen gas under proper conditions of temperature and pressure. Still another procedure consists of passing the reaction mixture through a stationary bed of pelleted or supported metal chromite catalyst enclosed in a reaction vessel of suitable design.

The following examples are given to illustrate my invention, and are not to be construed as limiting it to the exact reactants or conditions described:

EXAMPLE I

A series of experiments on the production of diisopropylamine from ammonia, acetone, and hydrogen in the presence of water with a copper chromite catalyst was carried out according to the following procedure, to demonstrate the effect of temperature on the reaction:

A mixture of acetone and ammonia in a 2:1 ratio of acetone to ammonia, 3% by weight of copper chromite catalyst, and 5.5% by volume of water, based on the total amount of acetone and ammonia, was introduced into a stainless steel bomb having a total volume of 1840 ml. After sealing the bomb, hydrogen was introduced to a pressure of 1000 lbs. per sq. in. gauge and the bomb heated to the desired temperature. As the hydrogenation proceeded, additional hydrogen was introduced from time to time to restore the pressure to its initial level. After hydrogen adsorption had stopped the bomb was cooled, vented, and the reaction product discharged and recovered by fractional distillation through an efficient laboratory column. The results obtained are shown in Table I.

Table I

| Temperature, ° C. | Conversion percent based on ammonia in reaction mixture | |
| --- | --- | --- |
|  | Diisopropylamine | Monoisopropylamine |
| 135 | 14.3 | 13.4 |
| 145 | 52.0 | 18.3 |
| 160 | 67.0 | 13.2 |
| 180 | 65.5 | 1.0 |

EXAMPLE II

A series of experiments was conducted at a constant temperature of 160° C. following the procedure outlined in Example I, and designed to show the effect of variations in pressure. The results obtained are shown in Table II.

Table II

| Pressure in lbs. per sq. in. | Conversion percent based on ammonia in reaction mixture | |
| --- | --- | --- |
|  | Diisopropylamine | Monoisopropylamine |
| 500 | 18.5 | 11.5 |
| 1,000 | 65.4 | 13.8 |
| 1,500 | 60.0 | 5.0 |

EXAMPLE III

A series of experiments was conducted at a constant temperature of 160° C. and at a constant pressure of 1000 lbs. per sq. in. following the procedure described in Example I and designed to show the effect of variations in the amount of water used. The results obtained are shown in Table III.

*Table III*

| Water, percent by vol. | Conversion percent based on ammonia in reaction mixture | |
|---|---|---|
| | Diisopropylamine | Monoisopropylamine |
| 0 | 39.3 | 11.9 |
| 3 | 53.2 | 30.5 |
| 5.5 | 67.0 | 13.2 |
| 8 | 41.7 | 19.9 |
| 10.5 | 56.1 | 0 |

EXAMPLE IV

A mixture consisting of acetone and ammonia in a 2:1 ratio of acetone to ammonia, 3% by weight of copper chromite catalyst and 5.5% by volume of water based on the total amount of acetone and ammonia used, was hydrogenated at 1000 lbs. per sq. in. at 160° C. until no further pressure drop occurred thus indicating completion of the reaction. The product was distilled and the following materials recovered: 64.8% diisopropylamine based on the amount of ammonia charged, 13.2% isopropylamine based on the amount of ammonia charged, 9.2% of the ammonia, and 5% of the acetone charged.

EXAMPLE V

A mixture consisting of acetone and ammonia in a 2:1 ratio of acetone to ammonia, 3% by weight co-precipitated cupric oxide-calcium fluoride catalyst and 5.5% by volume of water based on the total amount of acetone and ammonia used, was hydrogenated at 1500 lbs. per sq. in. at 160° C. until no further pressure drop occurred thus indicating completion of the reaction. The product was distilled and the following products recovered: 63% diisopropylamine based on the amount of ammonia charged and 12% isopropylamine based on the amount of ammonia charged.

It is to be understood that I am not limited to the preferred procedure as herein set out and that any equivalents or changes which would occur to one skilled in the art are to be construed as lying within the scope of my disclosure and claims hereunto appended.

What I claim is:

1. A process for the manufacture of diisopropylamine which comprises reacting under superatmospheric pressures and at elevated temperatures and in the presence of water and a catalyst selected from the group consisting of copper chromite and co-precipitated copper oxide-calcium fluoride, a mixture of ammonia, hydrogen, and acetone.

2. A process for the manufacture of diisopropylamine which comprises reacting under superatmospheric pressures and at elevated temperatures and in the presence of water and copper chromite catalyst, a mixture of ammonia, hydrogen, and acetone.

3. A process for the manufacture of diisopropylamine which comprises reacting under superatmospheric pressures and at elevated temperatures and in the presence of water an co-precipitated copper oxide-calcium fluoride catalyst, a mixture of ammonia, hydrogen, and acetone.

4. A process for the manufacture of diisopropylamine which comprises reacting under superatmospheric pressures ranging from 500 to 1500 lbs. per sq. in. and at a temperature between about 140–200° C., in the presence of water and copper chromite catalyst, a mixture of ammonia, hydrogen, and acetone.

5. A process for the manufacture of diisoproplyamine which comprises reacting ammonia, hydrogen and acetone at a pressure between about 900–1100 lbs. per sq. in. at a temperature between about 140–180° C. in the presence of water and copper chromite catalyst.

6. A process for the manufacture of diisopropylamine which comprises reacting ammonia and acetone in approximately a 2:1 ratio of acetone to ammonia with hydrogen at a pressure between about 900–1100 lbs. per sq. in. and at a temperature between about 140–180° C. in the presence of from 3–10 volume per cent of water, based on the total amount of ammonia and acetone, and copper chromite catalyst.

References Cited in the file of this patent

UNITED STATES PATENTS

| Number | Name | Date |
|---|---|---|
| 2,121,033 | Hasselstrom | June 21, 1938 |
| 2,278,372 | Olin et al. | Mar. 31, 1942 |
| 2,278,373 | Olin | Mar. 31, 1942 |
| 2,422,743 | O'Loughlin | June 24, 1947 |
| 2,452,602 | Robinson et al. | Nov. 2, 1948 |
| 2,497,310 | Larson | Feb. 14, 1950 |

OTHER REFERENCES

Yamaguchi, Chem. Zent., 1926, I, p. 3538.